Patented Dec. 5, 1933

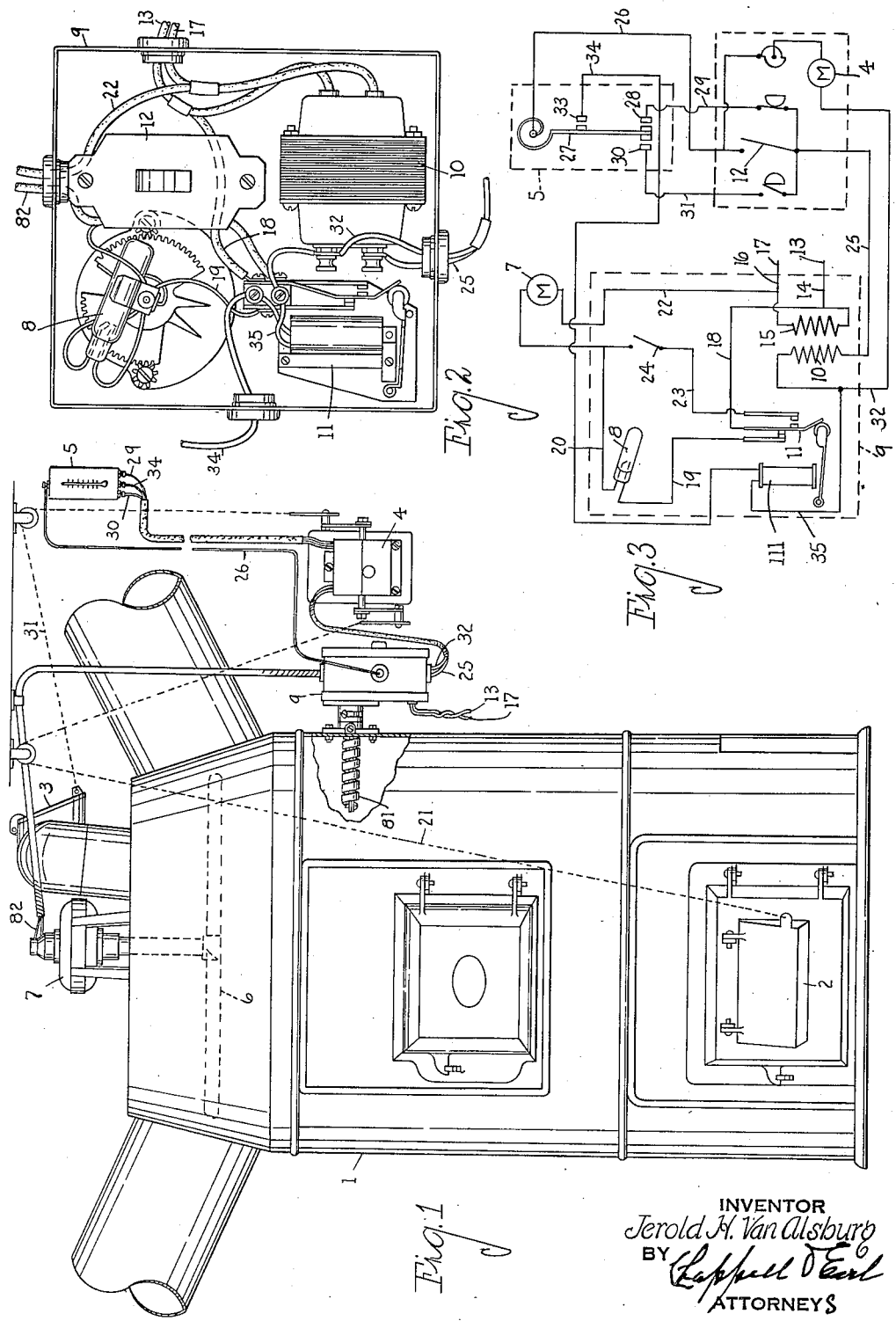

1,937,610

UNITED STATES PATENT OFFICE 1,937,610

AUTOMATIC HEAT CONTROL MEANS

Jerold H. Van Alsburg, Holland, Mich., assignor to Hart & Cooley Mfg. Co., Holland, Mich.

Application June 29, 1931. Serial No. 547,675

12 Claims. (Cl. 236—11)

This invention relates to improvements in automatic heat control means for warm air furnaces with fan or other auxiliary circulating means.

The objects of the invention are:

First, to provide automatic direct control to prevent the operation of the auxiliary fan at a temperature above the usual thermostat control.

Second, to provide independent auxiliary thermostat control for the circulating fan or means.

Third, to provide in the temperature control of an auxiliary circulating fan connections and switch devices and means for controlling a cooling circulation by the same circulating fan means which provides auxiliary circulation for the furnace.

Fourth, to provide such an equipment in which the various parts are assembled and organized into a single casing with the thermostatic fan switch with connections to the fan motor, and for the cut-out for said fan switch, and for a room thermostat and for the thermostat and damper control motor whereby installation is simplified and economy and accuracy of installation insured.

Fifth, to provide in a heat control system an auxiliary contact in the room thermostat for independently controlling the auxiliary fan.

Objects pertaining to details and economies of my invention will appear from the description to follow. The invention is defined in the claims.

A preferred embodiment of my invention is illustrated, in part diagrammatically, in the accompanying drawing as applied to an ordinary warm air furnace with auxiliary fan adapted for the burning of coal or other solid fuel, in which:

Fig. 1 is an elevation view partially in diagram of a warm air heating furnace with my improvement applied, the connection to the thermostat being shown broken and the connections to the draft damper and the check damper being indicated by dotted lines, a circulating fan being shown diagrammatically by dotted lines, and a part of the furnace casing being broken away to show the thermostat element of the fan switch control and the method of support.

Fig. 2 is an enlarged detail front elevation view of the case for the fan switch, compound relay, hand switch and transformer assembled within a single casing with the connections leading therefrom, the cover of the casing being removed, taken from the right hand of Fig. 1.

Fig. 3 is the wiring diagram and connections of the system.

The parts will be identified by their numerals of reference.

1 is the furnace casing. 2 is the draft damper and 3 is the check damper. 4 is the damper motor provided with connection 21 to the draft damper 2 and connection 31 to the check damper 3 in the usual form.

5 is the thermostat to which I have affixed an attachment, modifying it somewhat. The thermostat is provided with the usual connections to the damper motor. 6 is the circulating fan indicated by dotted lines in the top of the furnace casing, being driven by the fan motor 7.

8 is the thermostatic motor fan switch with thermal element 81 of a usual form extending into the furnace casing, see Fig. 1. A connection 82 extending from the switch 8 to the motor 7 is provided, which, of course, is brought into action when the predetermined temperature in the furnace casing is reached.

The switch 8 is supported in a casing or box 9 in which box is also disposed the transformer 10, the compound relay 11 and the auxiliary hand switch 12. The wiring will be readily understood by referring to the diagram.

The main 110-volt circuit comes in at 13 through a suitable aperture in the side of the case 9 and is extended at 14 into the primary coil 15, out at 16 to the outside at 17. This completes the primary circuit of the transformer 10. To wire 13 is the connection 18 extending to the compound relay 11 which, when the relay is in closed position as indicated, connects to circuit 19 leading to the thermostatic fan switch 8 from which extends circuit 20 to the fan motor 7, thence returning at 22 to the connection 17. When the compound relay 11 is closed it connects at 23 direct to conductor 20, by-passing the fan switch 8. The connection 23 is controlled by hand switch 24.

25 is the line leading from the transformer 10 to the damper motor 4. 26 is the line leading from the motor 4 to the room thermostat 5 and connecting to the flexible thermo-active element 27 thereof. 28 is the usual thermal contact for tripping the motor at the high temperature through connection 29 leading to the damper motor 4.

30 is the usual contact leading by the usual connection 31 to the damper motor 4 to trip and actuate the same on a drop in the temperature. These parts being well-known structures, they are not detailed herein but are merely indicated diagrammatically. The usual return 32 is provided to the transformer.

An additional contact 33 which is disposed in the room thermostat 5 to be actuated by the thermo-active element 27 if the room temperature increases has the usual thermostat contact actuating the damper motor to close the dampers. A connection 34 leads from this contact to the relay coil 111 which operates the compound relay 11, reversing the contact and delivering the current to the circuit 23 which is under the control of the hand switch 24. The relay coil is provided with the usual return 35 to the transformer.

In the organization of my improved structure I find that the various parts can be purchased as standard construction in the market. I, therefore, buy the transformer 10, the compound relay 11, the hand switch 12 and the thermo-active fan switch 8 and install and organize the same with the connections that I have here shown. The room thermostat is provided with an extra contact timed to close at a higher temperature than the usual thermostat connection. As this contacts with the flexible member or plate no adjustment is necessary to secure the correct timing when the structure is installed. It is only necessary in the installation of my device to provide the usual connection for supporting the thermostatic fan switch on the side of the furnace casing. This carries the casing 9 in which are disposed the transformer 10, the compound relay 11, the hand switch 12 and the thermostat fan switch 8 already referred to. It is only necessary to extend the connections and connect them properly to the thermostat 5, to the thermostat motor 4 and to the fan motor 7.

While I have shown the room thermostat as controlling the dampers to a warm air furnace, I would state that it has now become practice to provide such furnaces with oil burners, gas burners, or the like, all under thermostatic control. The thermostat, in the event that my invention is applied to such an installation, is the thermostat which controls the burner instead of the dampers, and my device is an adjunct in precisely the same way that it is to the thermostat here illustrated.

While I have shown the auxiliary contact 33 in the room thermostat with the connections to the relay to cut-out the fan, it is clear that an independent room thermostat could be placed in this independent circuit and the same could be set a degree or half a degree higher than the regular thermostat and the result be accomplished, although not so well as by the preferred construction.

It is thus clear that my invention is capable of use by organizing the various units to which I refer in various sizes with the connections as pointed out. I desire to claim the same specifically with the particular parts boxed and supported in connection with the thermostatic fan switch, and I also desire to claim the particular construction of room thermostat in this relation as well as double thermostats.

Having thus described my invention, what I claim as new and desire to secure by Letters Patent is:

1. In a control system of the class described, the combination with a warm air furnace having draft and check dampers, a room thermostat comprising a flexible member, and a damper motor connected to control said dampers, of a circulating fan for the air within the furnace casing, an electric motor therefor, a thermostatic switch having the thermostatic element within the furnace casing to control said fan motor, a transformer, a relay energized by the secondary of said transformer and responsive to said room thermostat, a hand switch, circuit connections leading to said transformer and to the switch to the room thermostat circuit, circuit connections therefrom to the relay switch, a circuit connection from the transformer to the relay switch, also to the room thermostat and also to the damper motor, an auxiliary circuit connection on the flexible member of the said room thermostat set to contact at a temperature above the cut-out temperature of the room thermostat to automatically control the relay switch to cut out the fan motor, and a direct circuit connection from the hand switch to control the fan motor to run the system as a cooling system in the event of high room temperature.

2. In a control system of the class described, the combination with a warm air furnace having draft and check dampers, a room thermostat comprising a flexible member, and a damper motor connected to control said dampers, of a circulating fan for the air within the furnace casing, an electric motor therefor, a thermostatic switch having the thermostatic element within the furnace casing to control said fan motor, a casing embracing said switch, a transformer within the said casing, a relay within the casing energized by the secondary of said transformer and responsive to said room thermostat, a hand switch within the casing, circuit connections leading to the said transformer and to the switch to the room thermostat circuit, circuit connections therefrom to the relay switch, a circuit connection from the transformer to the relay switch, also to the room thermostat and also to the damper motor, and an auxiliary circuit connection to the flexible member of the said room thermostat set to contact at a temperature above the cut-out temperature of the room thermostat to automatically control the relay switch to cut out the fan motor.

3. In a control system of the class described, the combination with a warm air furnace having draft and check dampers, a room thermostat, and a damper motor connected to control said damers, of a circulating fan for the air within the furnace casing, an electric motor therefor, a thermostatic switch having the thermostatic element within the furnace casing to control said fan motor, a transformer, a compound relay, a hand switch, circuit connections leading to the said transformer and to the switch to the room thermostat circuit, connections therefrom to the compound relay switch, a circuit connection from the transformer to the relay switch, also to the room thermostat and also to the damper motor, and an auxiliary circuit connection to the flexible member of the said room thermostat set to contact at a temperature above the cut-out temperature of the room thermostat to automatically control the relay switch to cut out the fan motor.

4. In a control system of the class described, the combination of a furnace having dampers, a damper control motor, a furnace air circulating fan, a thermal controlled switch associated with the furnace for said fan, a relay cut-out switch for the said fan, a room thermostat, and an auxiliary contact in the said room thermostat set to operate the said relay switch on a rise in room temperature after the room thermostat has cut off the heat by operation of the damper motor.

5. In a control system of the class described, the combination of a furnace having a damper, a damper control motor, a furnace air circulating fan, a thermal controlled switch associated with the furnace for said fan, a room thermostat, a cut-out switch for the said fan, and an auxiliary contact in the room thermostat set to operate the said switch on a rise in temperature after the room thermostat has cut off the heat by operation of the damper motor.

6. In a control system of the class described, the combination of a warm air furnace with an electric heat control therefor, a room thermostat for said controls, a circulating fan for the air within the furnace casing, an electric motor therefor, a thermostatic switch having a thermostatic element within the furnace casing to control said fan motor, an auxiliary thermostatic contact connection set at a slightly higher temperature than the regular room thermostat contacts, a cut-out switch for the said fan motor, and a circuit connection from said auxiliary thermostat contact to the said fan cut-out switch whereby the circulating fan will be cut out on a slight rise of temperature after the action of the room thermostat to control the electric heat control.

7. In a control system of the class described, the combination with a furnace having a thermostat heat control, of a circulating fan for the air within the furnace casing, an electric motor for said fan, a cut-out switch for the said fan motor, and an independent room thermostat connection to cut out the said fan on a slight rise of temperature beyond the control of the thermostat control.

8. In a control system of the class described, the combination of a warm air furnace having draft and check dampers, a damper control motor, a room thermostat having a main switch in the control circuit of said motor and having an auxiliary switch set to be operated at higher temperature limits than the main switch, a transformer having primary and secondary windings, means for supplying said primary winding from a source of alternating current, said secondary winding energizing said damper motor control circuit, a fan associated with the air circulating system of said furnace, a fan motor, a relay having a coil, an armature and a pair of switches controlled thereby, one of which is normally closed and the other open, a relay control circuit including said coil and said auxiliary switch and energized by said secondary winding, a fan motor control circuit including said one of said relay switches, a thermostatic switch in said relay control circuit and having a thermal element in the furnace casing, a hand switch connected in circuit relation with said other of said relay switches and the fan motor control circuit, and a single casing containing said transformer, relay, thermostatic switch and hand switch.

9. In a control system of the class described, the combination of a warm air furnace having a damper control motor, a room thermostat having a main switch in the control circuit of said motor and having an auxiliary switch set to be operated at higher temperature limits than the main switch, a transformer having primary and secondary windings, means for supplying said primary winding from a source of alternating current, said secondary winding energizing said damper motor control circuit, a fan associated with the air circulating system of said furnace, a fan motor, a relay having a coil, an armature and a pair of switches controlled thereby, one of which is normally closed and the other open, a relay control circuit including said coil and said auxiliary switch and energized by said secondary winding, a fan motor control circuit including said one of said relay switches, a thermostatic switch in said relay control circuit and having a thermal element in the furnace casing, and a hand switch connected in circuit relation with said other of said relay switches and the fan motor control circuit.

10. In a control system of the class described, the combination of a warm air furnace having a damper control motor, a room thermostat having a main switch in the control circuit of said motor and having an auxiliary switch set to be operated at higher temperature limits than the main switch, a fan associated with the air circulating system of said furnace, a fan motor, a fan motor control circuit including said auxiliary switch, and a thermostatic switch in said fan motor control circuit and having a thermal element in the furnace casing.

11. In a control system, the combination of a warm air furnace having temperature regulating means including a room thermostat provided with an auxiliary switch adapted to be operated at a different temperature than said means, air circulating means for the furnace controlled by said auxiliary switch, a thermostatic switch associated with the furnace bonnet for controlling said air circulating means in conjunction with said auxiliary switch, whereby the air circulating means is operated only when the furnace temperature is above a certain degree and the room temperature below a certain degree, and manually controlled means for nullifying the action of said thermostatic switch to convert the air circulating means to cooling alone.

12. In a control system, the combination of a warm air furnace having temperature regulating means including a room thermostat provided with an auxiliary switch adapted to be operated at a different temperature than said means, air circulating means for the furnace controlled by said auxiliary switch, and a thermostatic switch associated with the furnace bonnet for controlling said air circulating means in conjunction with said auxiliary switch, whereby the air circulating means is operated only when the furnace temperature is above a certain degree and the room temperature below a certain degree.

JEROLD H. VAN ALSBURG.